US008849493B2

(12) United States Patent
Prada Gomez et al.

(10) Patent No.: US 8,849,493 B2
(45) Date of Patent: *Sep. 30, 2014

(54) TRANSITIONING A MIXED-MODE VEHICLE TO AUTONOMOUS MODE

(71) Applicant: Google Inc., Mountain View, CA (US)

(72) Inventors: Luis Ricardo Prada Gomez, Hayward, CA (US); Nathaniel Fairfield, Mountain View, CA (US); Andy Szybalski, San Francisco, CA (US); Philip Nemec, San Jose, CA (US); Christopher Urmson, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/660,071

(22) Filed: Oct. 25, 2012

(65) Prior Publication Data

US 2014/0018992 A1    Jan. 16, 2014

Related U.S. Application Data

(63) Continuation of application No. 13/293,905, filed on Nov. 10, 2011, now Pat. No. 8,321,067, which is a continuation of application No. 13/105,101, filed on May 11, 2011, now Pat. No. 8,078,349.

(51) Int. Cl.
*G01C 22/00*    (2006.01)

(52) U.S. Cl.
USPC .............................................. 701/23; 701/2

(58) Field of Classification Search
CPC .... B62D 15/0285; B62D 15/028; B62D 1/28; G08G 1/096811
USPC ....................................................... 701/2, 23
See application file for complete search history.

(56) References Cited

U.S. PATENT DOCUMENTS

| 6,754,580 | B1* | 6/2004 | Ask et al. ...................... 701/117 |
| 7,920,070 | B2* | 4/2011 | Chen et al. ................. 340/932.2 |
| 2009/0167564 | A1* | 7/2009 | Long-Tai et al. ........... 340/932.2 |
| 2010/0066515 | A1* | 3/2010 | Shimazaki et al. ........... 340/435 |
| 2010/0183409 | A1* | 7/2010 | Checketts et al. ............ 414/231 |
| 2010/0185353 | A1* | 7/2010 | Barwick et al. ................. 701/23 |
| 2010/0228420 | A1* | 9/2010 | Lee ................................. 701/26 |
| 2010/0280956 | A1* | 11/2010 | Chutorash et al. .............. 705/64 |

FOREIGN PATENT DOCUMENTS

KR    10-2008-0024887    3/2008

OTHER PUBLICATIONS

The Korean Intellectual Property Office Notice of Office Action. Mailed Mar. 17, 2014 (English Translation Attached).
Hyung-Rok Seo and other, "Design of Integration System for Unmanned Vehicle," Conference of The Institute of Electronics Engineers of Korea, pp. 1458 to 1460 (Jun. 2010).

* cited by examiner

*Primary Examiner* — Hussein A. Elchanti

(57) ABSTRACT

Disclosed are methods and devices for transitioning a mixed-mode autonomous vehicle from a human driven mode to an autonomously driven mode. Transitioning may include stopping a vehicle on a predefined landing strip and detecting a reference indicator. Based on the reference indicator, the vehicle may be able to know its exact position. Additionally, the vehicle may use the reference indictor to obtain an autonomous vehicle instruction via a URL. After the vehicle knows its precise location and has an autonomous vehicle instruction, it can operate in autonomous mode.

19 Claims, 6 Drawing Sheets

TRANSITIONING A MIXED-MODE VEHICLE TO AUTONOMOUS MODE

CROSS REFERENCE TO RELATED APPLICATION

The present application claims priority to both U.S. patent application Ser. No. 13/293,905, filed on Nov. 10, 2011 and U.S. patent application Ser. No. 13/105,101, filed on May 11, 2011, the entire contents each is herein incorporated by reference.

BACKGROUND

Unless otherwise indicated herein, the materials described in this section are not prior art to the claims in this application and are not admitted to be prior art by inclusion in this section.

Various technologies can be utilized for the control of autonomous vehicles. Some systems involve placing a reference line for the vehicle to follow, while other systems may have a pre-defined route programmed into a vehicle. For example, an autonomous vehicle may be coupled to a track on the ground for guidance purposes. Other autonomous vehicles may be controlled by a computer and follow a route based on information stored in the computer.

An autonomous vehicle's computer system may allow new route information to be programmed. A vehicle may be given a new route to follow based on maps or based on global position system (GPS) signals. Some autonomous vehicles may operate in non-autonomous mode where they can be driven similar to traditional human-controlled vehicles. When vehicles are driven in an autonomous mode, however, they may require more precise position information then when driven by a human operator.

all arranged in accordance with at least some embodiments of the present disclosure.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods and systems disclosed herein generally relate to transitioning a mixed-mode autonomous vehicle from being driven by a human operator to being driven in autonomous mode. In some example embodiments, the system may include a transition region comprising a landing strip and a reference indicator. The landing strip can act as a reference location for a human to park the mixed-mode autonomous vehicle. When the vehicle is parked on the landing strip, a detector on the vehicle can read the reference indicator. The reference indicator may provide some data allowing the vehicle to transition into autonomous operation mode.

1. System for Transitioning a Mixed-Mode Autonomous Vehicle

Figure 1:
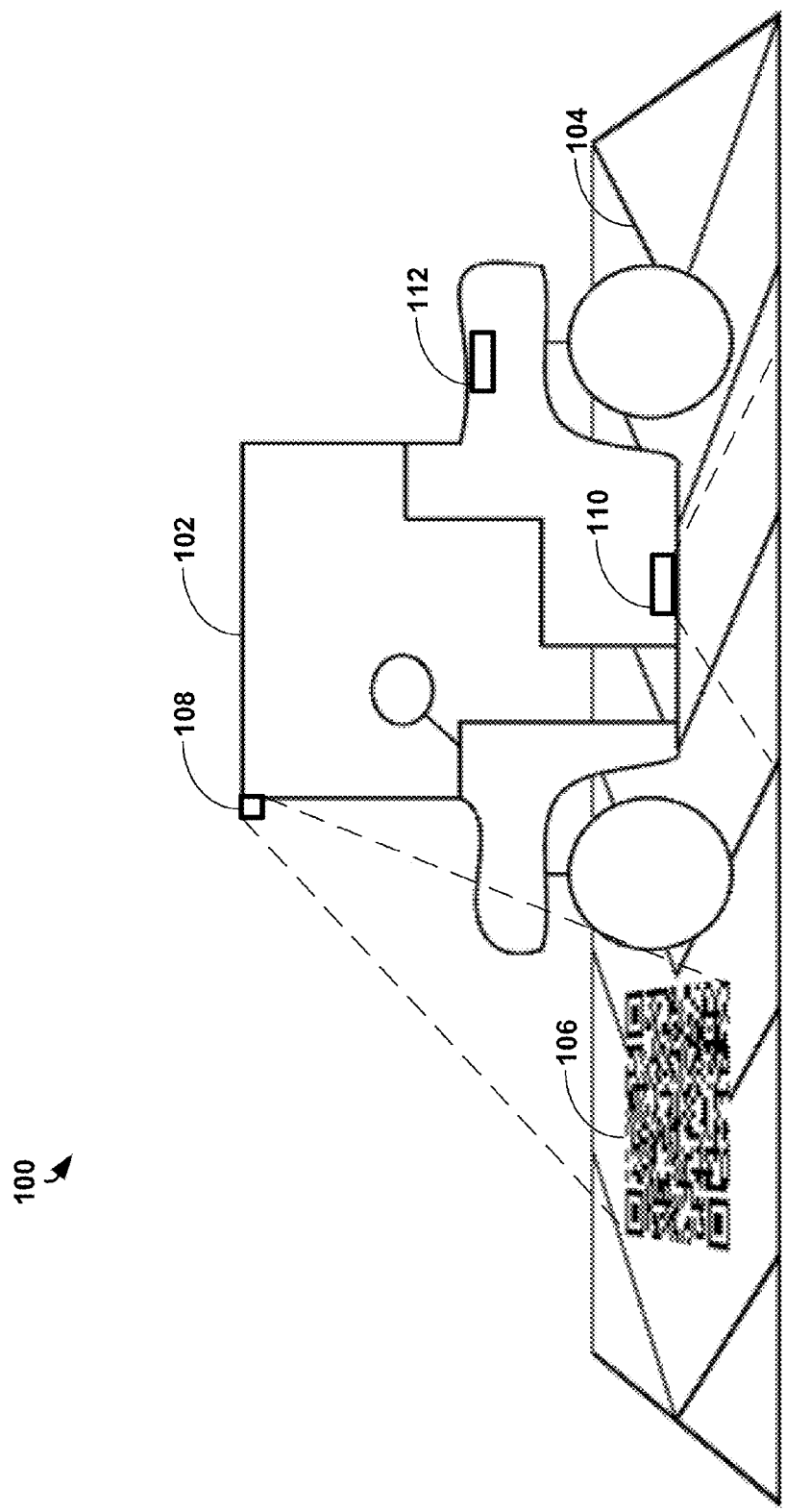
FIG. 1 shows an example embodiment of a system for transitioning a mixed-mode autonomous vehicle from human-drive mode to an autonomous-drive mode.

FIG. 1 shows an example embodiment of a system for transitioning a mixed-mode autonomous vehicle from human-drive mode to an autonomous-drive mode. In an example embodiment, the mixed-mode autonomous vehicle system 100 may have an autonomous vehicle 102, a landing strip 104, and a reference indicator 106. The autonomous vehicle 102 may be equipped with a landing sensor 110 to detect the landing strip 104, and a reference sensor 108 configured to detect the reference indicator 106. Additionally, the vehicle may have a computer system 112 to provide data processing.

In some embodiments, the reference indicator 106 may be located on the ground within the landing strip. In other situations, the reference indicator may be mounted within the line of sight of a reference sensor 108 (such as a camera) on the autonomous vehicle 102. The reference indicator 106 may be a QR Code (as shown in FIG. 1), a one-dimensional barcode, or a radio tag. The vehicle may be equipped with both optical sensors and radio sensors for the reference sensor 108, so it would detect more than one type of reference indicator. Additionally, the autonomous vehicle 102 has landing sensor 110 for detecting the landing strip 104. The landing strip may contain a specific pattern the vehicle 102 recognizes. Similarly, the landing sensor 110 may be either an optical sensor, radio sensor, or both. In some embodiments, the landing sensor 110 and the reference sensor 108 may be the same sensor.

When a human driver stops the vehicle 102 on a landing strip 104, the vehicle can start the transition to autonomous drive mode. The landing sensor in the vehicle may detect the landing strip 104 and may responsively detect the reference indicator 106. The landing sensor may also act as a threshold to initiate the search for the reference indicator. The reference indicator may contain reference data decoded by an analysis module in the computer 112 of the vehicle. The data may take the form of a physical address, an internet address such as an Internet Uniform Resource Locator (URL), global coordinates, or other information. The vehicle can use the data from the reference indicator to precisely locate itself Location data may be stored in the reference indicator, on the internet, or in a database within the computer. Using exclusively GPS may not give enough accuracy for autonomous vehicle operation. For example, in some cases GPS may only give accuracy to about 30 feet, so additional accuracy may be beneficial. A 30 foot margin of error may be too great to operate an autonomous vehicle, for instance, on a sidewalk or a manufacturing facility with a number of different work stations.

When the vehicle knows its precise location, operation in autonomous mode may be improved. Autonomous driving directions can be stored in and retrieved from the vehicle memory, in a database, or on the Internet. In some embodiments, new autonomous driving directions can be received by a computer 112 in the vehicle wirelessly over a radio link such as a cellular network, an 802.11 network, or a Wireless Wide Area Network (WWAN). The reference indicator 106 can also provide data related to autonomous driving directions as well as position information. For example, in a specific location, a vehicle may know it can only operate in one predefined path, when the reference indicator 106 designates that location, the vehicle knows the exact path of travel.

2. Example Embodiments of the Landing Strip and the Reference Indicator

Figure 2A:
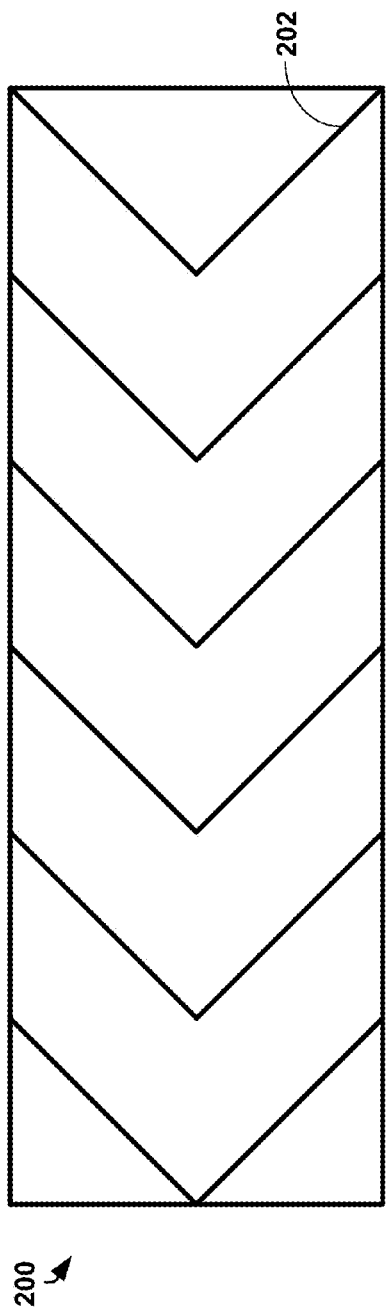
FIG. 2A is an example landing strip apparatus.
Figure 2B:
FIG. 2B depicts an example of a reference indicator.

FIGS. 2A and 2B show a landing strip 202 and reference indicator 250 that are not necessarily collocated. FIG. 2A is an example landing strip apparatus for use in the systems of FIG. 1. The landing strip 202 may serve multiple purposes, for instance it can inform a human vehicle operator of the correct location to return the vehicle and it can also let the vehicle know when it has been returned. Additionally, the landing strip 202 may indicate a desired direction for operators to park the vehicle.

The landing strip 202 may be simply a single marking on the ground, on a wall, or on a sign. The unique pattern show on landing strip 202 is merely exemplary and many different variations are possible. In another example embodiment, the landing strip is long enough to accommodate multiple vehicles, and there may be boxes or lines to indicate the preferred positions for the vehicles to form a line. Another example could include using arrows (similar to those used in a drive-through) to indicate entrance and exits to the landing strip. In some embodiments, the landing strip 202 and the reference indicator 250 are the same and/or integrated.

In various embodiments the landing strip 202 may not have a pattern printed on the ground, upon which the vehicle is parked. The landing strip 202 may be a traditional parking spot with a sign indicating it is for autonomous vehicles. The landing sensor 110 (FIG. 1) of the vehicle 102 may be able to identify the parking spot based on its surroundings and know it is in a landing strip. For example, a camera or other type of sensor may be able to identify the sign categorizing the autonomous vehicle parking spot.

In a further embodiment, the landing strip 202 may correspond to a specific parking spot. For example, the vehicle may have a GPS receiver that give a rough position estimate. Based on this rough estimate, the vehicle may be able to determine is it in the area of a landing strip and use the landing sensors 110 to detect when it is in a known landing strip position. In some embodiments, the sensors 110 may detect trees, foliage or other known landmarks to see if the vehicle is in a known position. Once the vehicle is known to be on a landing strip, the reference sensor 108 may search for a reference indicator. Additionally, the landing strip may contain sensors to know when the vehicle is parked. For example, an RFID tag on the vehicle may be read by a sensor in the landing strip. In additional embodiments, the landing strip 202 may include the ability to charge a battery in the vehicle. For example, the landing strip may include an inductive charging system that may couple to the inductive charging system in the vehicle when the vehicle is parked. The wireless power transfer provided by the inductive charging may reduce the need for vehicles to be physically attached to a charging station.

FIG. 2B depicts an example of a reference indicator 250. The reference indicator 250 may be read by a reference sensor 108 on the vehicle. The specific reference indicator 250 as shown in FIG. 2B is a QR Code, a two-dimensional barcode containing data. A QR Code may contain encoded address or position information. The vehicle will be able to determine its precise location based on the encoded data in the QR Code. The code could also contain exact global coordinates (latitude and longitude) relating to the QR Code location or the landing strip location. In some embodiments, the vehicle may be able to see more than one QR Code from the landing strip. Each QR code may provide data to the vehicle. Additionally, in some embodiments, the vehicle may be able to see QR Codes while it is driving. These QR codes may provide data to the vehicle before it reaches a landing strip.

The reference indicator 250 is not limited to QR Codes, or any printed code. In some embodiments, the reference indicator may be an RFID, NFC, or other radio based device. Any device that can provide unique data could be used for the reference indicator 250. In some embodiments, the data provided by the reference indicator 250 may be encoded or cryptographically signed for security purposes. By providing encoded or cryptographically signed data, the ability for a third party to disrupt the autonomous vehicles may be mitigated. Additionally, the QR Code could provide secondary functionality. For example, if a human driver needs a vehicle, he may take a picture of a QR Code reference indicator 250 on his cell phone. The phone may be able to interpret the QR Code as an Internet URL. The URL could allow the human driver to request an autonomous vehicle to the present location.

In some embodiments, a URL stored as a QR Code may enable the autonomous vehicle to download new instructions. A processing unit in the vehicle's computer may be able to wirelessly access the Internet and retrieve autonomous mode instructions from an updated web location. For example, when accessing the URL, a unique vehicle serial number may be transmitted. The serial number could indicate that vehicle is in need of maintenance and the host may return instructions for the autonomous vehicle to automatically drive itself to the maintenance shop. Additionally, the URL may return instructions to load balance the vehicles. For example, if a campus was having a meeting, a majority of the vehicles may be driven to one location leaving other vehicle locations empty. The URL could return instructions for a specific vehicle to autonomously drive itself to a location where the number of vehicles is below a threshold limit. Thus, every autonomous vehicle station would be sure to have vehicles as the system may be able to direct vehicles to where they are needed.

Various embodiments may include the reference indicator 250 providing location data to the vehicle. The location data could be the exact coordinates of the reference indicator 250 or the exact coordinates of the landing strip 202. In some embodiments, where the reference indicator provides location data related to the location of the reference indicator 250 and not of the landing strip 202, the vehicle may calculate or make a measurement of the distance from the vehicle to the reference indicator 250. By combining the known location information of the reference indicator 250 with the distance from the indicator, the computer in the vehicle can calculate its exact position. In an exemplary embodiment, this can be performed using dead reckoning or a combination of dead reckoning with other technologies and sensors such as GPS.

In some embodiments, the reference indicator 250 may be a radio link. For example, the reference indicator could be a passive radio link such as a radio frequency identification (RFID) located in the ground at a landing strip. The reference indicator 250 could provide a unique identification via the radio. The vehicle could look up location information in a database or via the Internet based on the unique identification. The radio link could be any form of near field radio transmission, such as RFID, near field communication (NFC), Bluetooth, ZigBee, or other wireless protocol. In some embodiments, location data can be transmitted over the radio link. While in other embodiments, data is transmitted that the vehicle can use to look up location data. The vehicle may look up information in an onboard database or on the Internet.

Additionally, the radio link may be an active system where the radio is connected to a computer system or computer network. When the reference sensor 108 interacts with the radio, the radio may be able to use the computer system or computer network to send information to the vehicle. The data sent to the vehicle may not be generated until a radio link is established.

Figure 3:
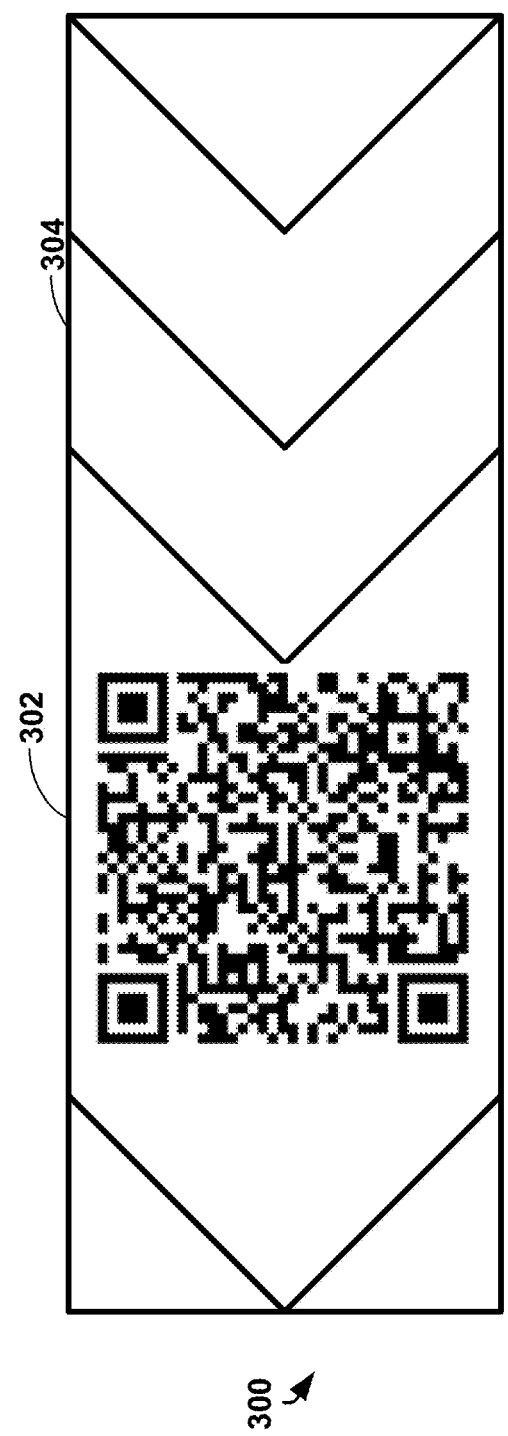
FIG. 3 depicts an example of a combined landing strip and reference indicator.

FIG. 3 depicts an example of a combined landing strip and reference indicator. Here, landing strip 304 and reference indicator 302 are collocated in the same region. When an autonomous vehicle is parked on the landing strip 304, the reference detector may be able to identify the reference indicator 302. When the reference indicator 302 and the landing strip 304 are collocated, no new limitation are imposed on either the landing strip 304 and reference indicator 302. The same features described above as parts of FIGS. 2A and 2B may be part of the collocated landing strip 304 and reference indicator 302. Additionally, the landing sensor 110 and the reference sensor 108 may be the same sensor.

3. Example Embodiments of Vehicle Transition Methods

Figure 4:
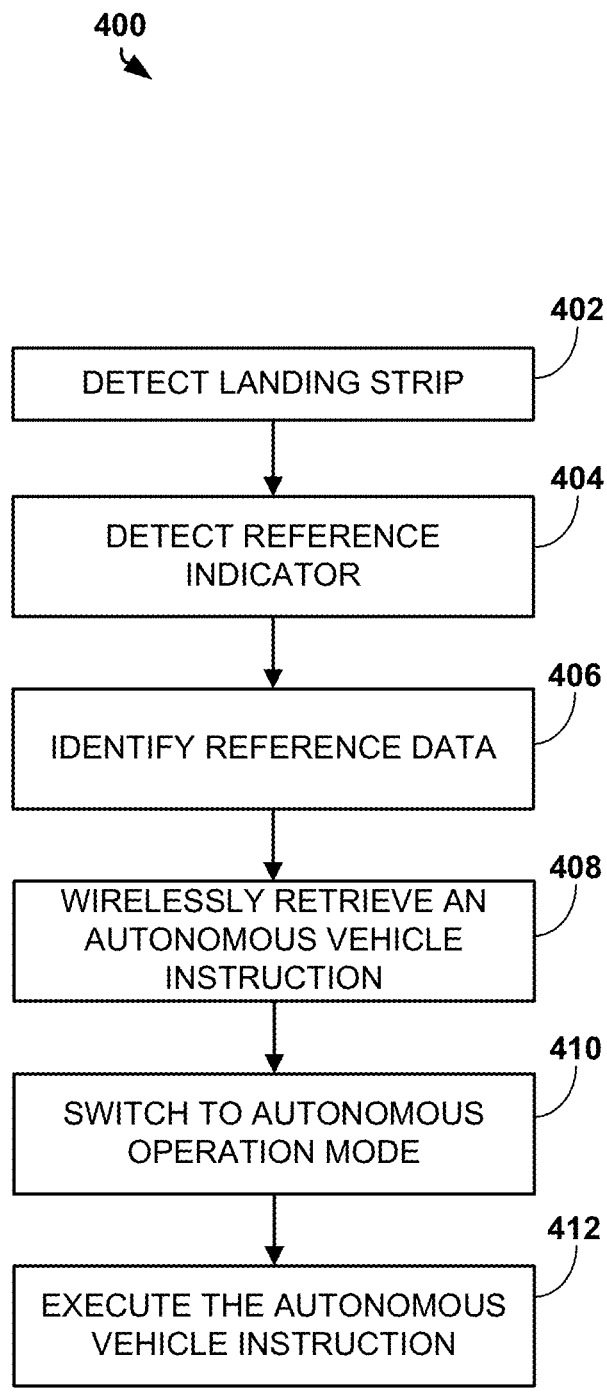
FIG. 4 is an example of transitioning a mixed-mode autonomous vehicle from a human driven mode to an autonomous driven mode.

FIG. 4 is an example of transitioning a mixed-mode autonomous vehicle from a human driven mode to an autonomous driven mode, in accordance with at least some embodiments described herein. Method 400 shown in FIG. 4 presents an embodiment of a method that, for example, could be used with the apparatuses 200, 250 and 300, and the system 100. Method 400 may include one or more operations, functions, or actions as illustrated by one or more of blocks 402, 404, 406, 408, 410, and 412. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Method 400 may begin at block 402, "DETECT LANDING STRIP." In some examples of block 402, the vehicle is configured to detect a landing strip. In some embodiments the landing strip is detected with a landing strip detector. The landing strip detector may be an optical camera. The landing strip detector may be configured to only detect a landing strip when the vehicle is not in motion. In come embodiments, the vehicle may wait until motion has stopped before attempting to detect a landing strip.

The landing strip may be a dual purpose device, it functions with both the human driver and the computer in the vehicle. The landing strip allows a human driving the vehicle to know acceptable parking places for the vehicle. Additionally, the landing strip may indicate to the vehicle that it is parked in a region where it may transition into autonomous mode.

Block 402 may be followed by block 404, "DETECT REFERENCE INDICATOR." In some examples of block 404, the vehicle is configured to detect a reference indicator. In some embodiments the reference indicator is detected with a reference detector. The reference indicator may be configured to provide reference data to the vehicle.

The reference detector may be an optical detector, radio detector, or other suitable detector. The reference indicator may be a graphic with encoded data or a wireless transmitter sending reference data. The reference indicator may provide reference data in an encrypted format or in an unencrypted format. Data may be encrypted in a QR code or in an encrypted radio format.

Block 404 may be followed by block 406, "IDENTIFY REFERENCE DATA." In some examples of block 406, reference data provided by the reference indicator is identified.

In one embodiment, the reference data provided by the reference indicator may be location data. The location data may be the precise location of the landing strip or of the reference indicator itself. In further embodiments, the data provided by the reference indicator may be used by a computer on the vehicle to look up location information. Location information may be stored in a database or on the internet. A wireless connection in the vehicle may allow the computer to download location information from the internet based on the data provided from the reference indicator. Based on the location information, the vehicle may know its precise location.

In another embodiment, the reference data provided by the reference indicator may be an internet address. The internet address may provide location data as well as an autonomous vehicle instruction. In fact, the reference data may provide both explicit location information as well as an internet address.

Block 406 may be followed by block 408, "WIRELESSLY RETRIEVE AN AUTONOMOUS VEHICLE INSTRUCTION." In some examples of block 408, the vehicle wirelessly retrieves an autonomous vehicle instruction based on the reference data. The autonomous vehicle instruction provides information to the vehicle to allow the vehicle to drive on a route without having a human driver control the vehicle directly. The autonomous instructions may be global coordinates of a path the vehicle should drive. The instructions may also be distance and direction instructions and may not rely on global coordinates (i.e. Latitude and Longitude).

For example, instructions that do not rely on coordinates may instruct a vehicle to "drive 5 feet forward, turn 30 degrees to the left, and drive 45 feet." In other embodiments, the instructions could be stored as exact coordinates, such as "Drive to 41.882687,−87.623308 then turn left and drive to 41.880989,−87.622882." A very precise and continuous GPS would not be required to follow the coordinate system if the starting position is exactly known, because the vehicle can monitor its path and know its exact location based on its starting point.

In an example embodiment, the reference indicator may contain data for use as a lookup in a database. The database may provide both location information as well as autonomous instructions. The database may be located either on a computer within the vehicle or it may be accessed wirelessly by the vehicle. The wireless connection could be an 802.11 network, a cellular network, Bluetooth, or other wireless device.

In another example embodiment, the reference indicator may contain data providing an encoded instruction. The instruction may be stored on the reference indicator itself. If the reference indicator is a QR Code, it may provide both the location information as well as encoded vehicle instructions for the computer to decode. In other embodiments, the reference indicator may be a radio tag. The information transmitted from the radio tag may include both location information as well as encoded vehicle instructions.

In a further example embodiment, the reference indicator may contain an internet address or a URL. The vehicle may access the URL over a wireless connection. When the vehicle accesses the URL, it may transmit a serial number of the vehicle along with the URL. When the URL is accessed, vehicle instructions may be provided based on the specific reference indicator that provided the URL as well as the vehicle serial number.

For example, if a specific vehicle is known to need maintenance, the URL may return autonomous instructions telling the vehicle to drive to the maintenance shop. In other embodiments, the URL may return instructions to load balance the vehicles. For example, if several vehicles have been driven to one location, only a few vehicles may be located at other locations. When the URL is accessed by a vehicle, the URL may return autonomous instructions telling the vehicle to drive to a location that currently has a low number of vehicles. In additional embodiments, the URL may return autonomous instructions regardless of the vehicle's serial number. For example, if any vehicle always has the same instructions at one specific location, the URL will always return the same instructions, regardless of the vehicle's serial number.

Block 408 may be followed by block 410, "SWITCH TO AUTONOMOUS OPERATION MODE." In some examples of block 410, the vehicle switches from a human-drive mode to an autonomous-drive mode. In order for autonomous operation, the vehicle should have an instruction as well as know its precise location. When it has been parked on a landing strip and location data has been obtained, the vehicle may switch to autonomous operation. In some embodiments, the vehicle may wait to receive an instruction to switch to autonomous mode. The instruction may be received wirelessly or it may be a button pushed by the human when they want to enable autonomous mode.

In further embodiments, autonomous mode may be enabled automatically after a set period of time. For example, once the vehicle stops on a landing strip, it may wait 5 minutes (or some other amount of time) before switching to autonomous mode. The wait period may enable a human who was driving the vehicle to exit the vehicle and remove his possessions. Additionally, the vehicle may be equipped with additional sensors that enable it to detect when the human has moved a sufficient distance away from the vehicle to allow safe autonomous operation.

Block 410 may be followed by block 412, "EXECUTE THE AUTONOMOUS VEHICLE INSTRUCTION." In some examples of block 412, the autonomous vehicle executes the autonomous vehicle instruction. The vehicle instruction may be the same vehicle instruction that was retrieved in Block 408. In some embodiments, the vehicle instruction directs the vehicle to drive itself to a specific location along a known path. In other embodiments, the vehicle instruction may direct the vehicle to follow a known path and stop at predetermined locations.

For example, the autonomous vehicle may be used as a virtual tour guide of Millennium Park in Chicago. In the example embodiment, the vehicle may have an instruction to drive to the Cloud Gate (Silver Bean) sculpture at Millennium Park. When the vehicle arrives, the autonomous instruction may tell it to wait in the location for a predetermined amount of time, for example 5 minutes. The instruction may then direct the vehicle to drive to the Crown Fountain at Millennium Park and again wait for 5 minutes. Next, the instruction may tell the vehicle to drive to the Ice Rink at Millennium Park and wait for another predetermined amount of time. Finally, the vehicle instruction may tell the vehicle to return to its starting position.

In some embodiments, the vehicle instruction may be a fixed instruction telling the vehicle a single route and timing for the route. In another embodiment, the autonomous instruction may be a list of possible instructions presented to a human in the vehicle. The human may be able to select a point of interest and the vehicle will responsively execute the associated autonomous instruction. In a further embodiment, the vehicle instruction is a single command telling the vehicle to drive itself to one specific location.

4. Example Computer Hardware for Vehicle Transition Methods

Figure 5:
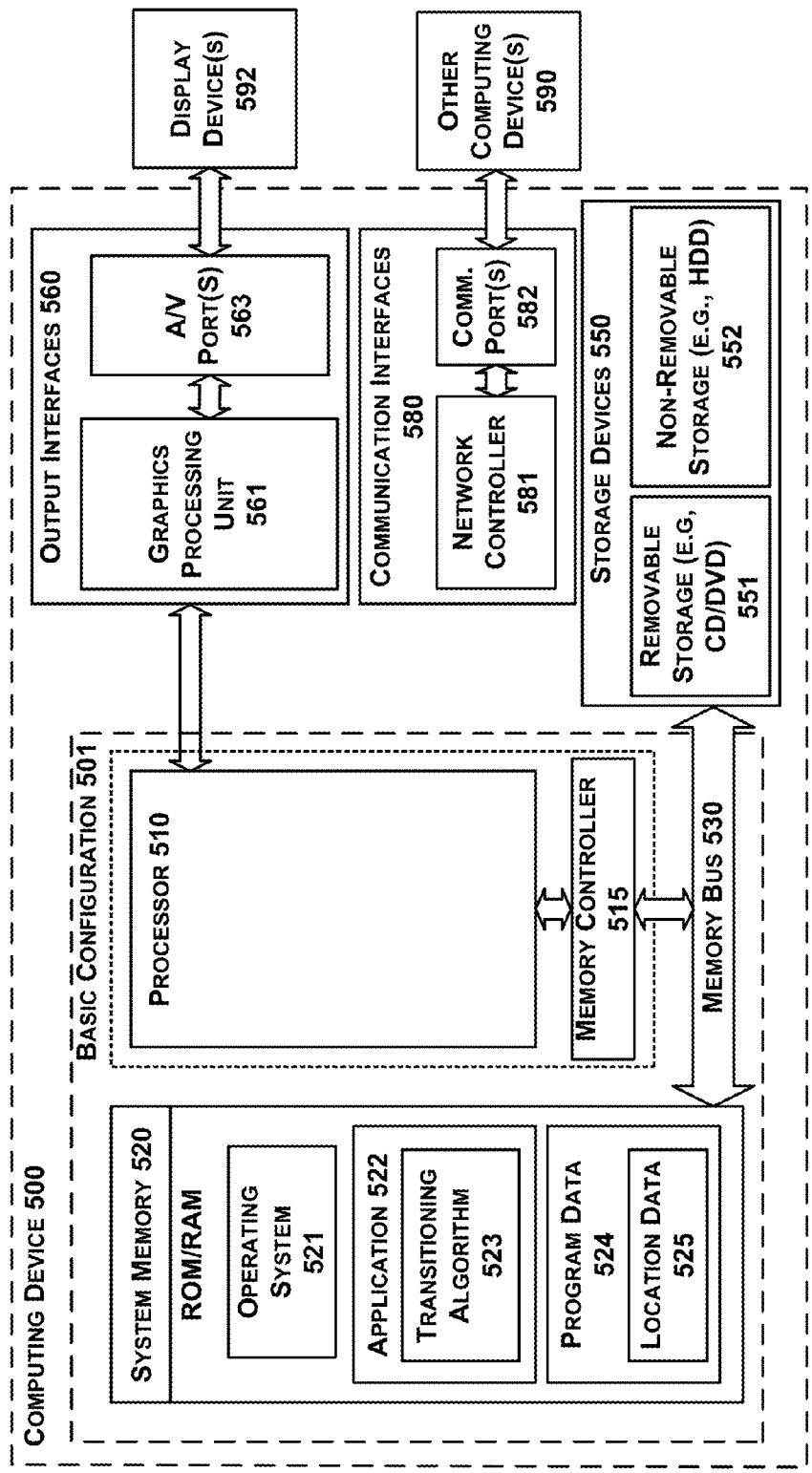
FIG. 5 is a functional block diagram illustrating an example computing device; and, FIG. 6 is a schematic illustrating a conceptual partial view of an example computer program.

FIG. 5 is a functional block diagram illustrating an example computing device used in a computing system that is arranged in accordance with at least some embodiments described herein. The computing device may be a personal computer, mobile device, cellular phone, video game system, or global positioning system. In a very basic configuration 501, computing device 500 may typically include one or more processors 510 and system memory 520. A memory bus 530 can be used for communicating between the processor 510 and the system memory 520. Depending on the desired configuration, processor 510 can be of any type including but not limited to a microprocessor (µP), a microcontroller (µC), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes one or more applications 522, and program data 524. Application 522 may include a transitioning algorithm 523 that is arranged to provide inputs to the electronic circuits, in accordance with the present disclosure. Program Data 524 may include location data 525 that could provide location data to the electronic circuits. In some example embodiments, application 522 can be arranged to operate with program data 524 on an operating system 521. This described basic configuration is illustrated in FIG. 5 by those components within dashed line 501.

Computing device 500 can have additional features or functionality, and additional interfaces to facilitate communications between the basic configuration 501 and any devices and interfaces. For example, the data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, removable and non-removable media implemented in any method or technology for storage of information, such as computer readable instructions, data structures, program modules, or other data.

System memory 520, removable storage 551, and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include output interfaces 560 that may include a graphics processing unit 561, which can be configured to communicate to various external devices such as display devices 592 or speakers via one or more A/V ports 563 or a communication interface 580. A communication interface 580 may include a network controller 581, which can be arranged to facilitate communications with one or more other computing devices 590 over a network communication via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Figure 6:
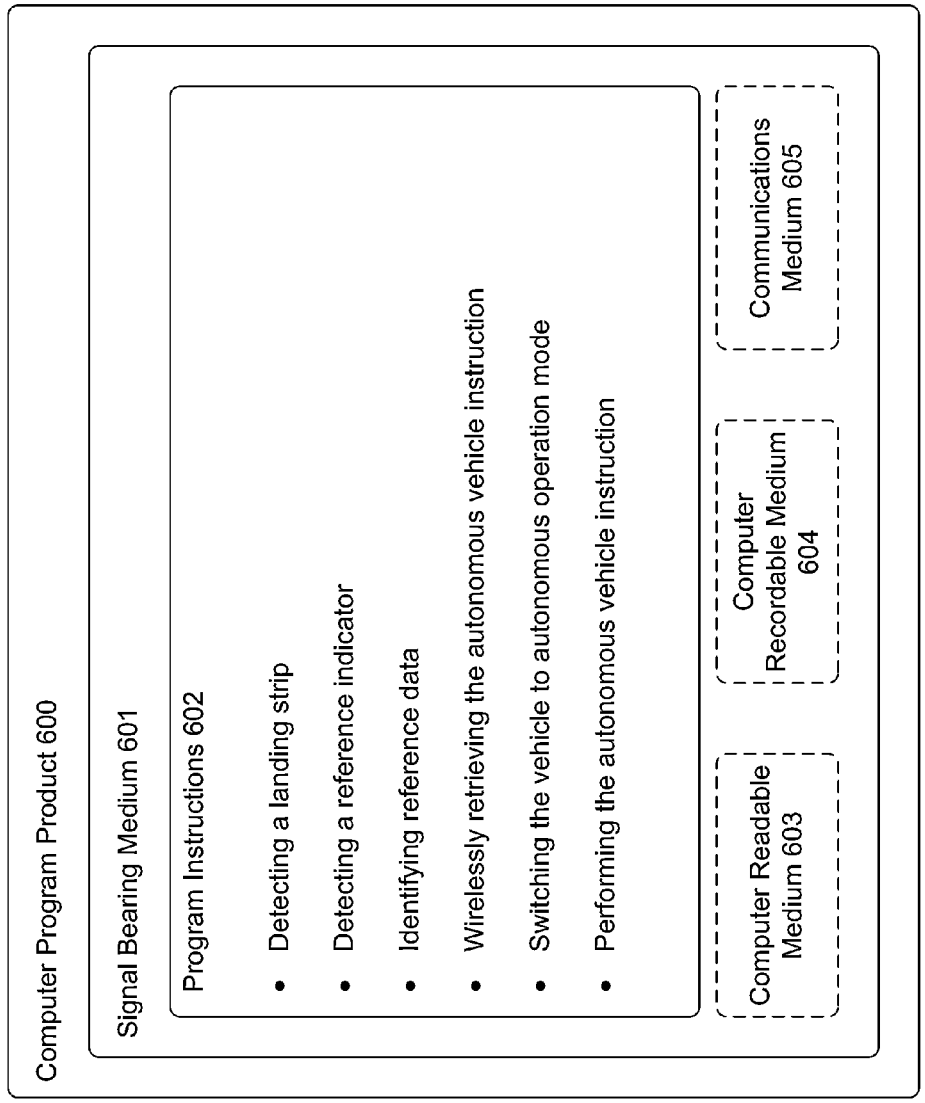

In some embodiments, the disclosed methods may be implemented as computer program instructions encoded on a computer-readable storage media in a machine-readable format. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-6. Thus, for example, referring the embodiment shown in FIG. 4, one or more features of blocks 402, 404, 406, 408, 410, and/or 412 may be undertaken by one or more instructions associated with the signal bearing medium 601.

In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming with the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 500 by one or more of the computer readable medium 603, the computer recordable medium 604, and/or the communications medium 605.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. An apparatus comprising:
   a landing strip, the landing strip comprising an indication of an autonomous parking location; and
   a reference indicator associated with the landing strip capable of being read by an autonomous vehicle, wherein the reference indicator is configured to provide reference data having an associated autonomous vehicle instruction and having associated location information comprising global coordinate information.

2. The apparatus of claim 1, wherein the autonomous vehicle transitions from a manual mode to an autonomous mode after parking and receiving the autonomous vehicle instruction.

3. The apparatus of claim 1, wherein the landing strip comprises a marking on a ground surface.

4. The apparatus of claim 1, wherein the landing strip comprises a marking on a wall.

5. The apparatus of claim 1, wherein the landing strip comprises a sign.

6. The apparatus of claim 1, wherein the reference data comprises an internet address.

7. The apparatus of claim 1, wherein the autonomous vehicle instruction is based in part on a serial number of the vehicle.

8. The apparatus of claim 1, wherein the reference indicator is a graphic.

9. The apparatus of claim 8, wherein the graphic is a Quick Response (QR) code.

10. A method comprising:
    detecting a reference indicator using a reference sensor in a vehicle, wherein the reference indicator provides reference data, and wherein the reference data provides associated location information comprising global coordinate information;

the vehicle wirelessly retrieving an autonomous vehicle instruction associated with both the reference data and a serial number of the vehicle; and, the vehicle executing the autonomous vehicle instruction.

11. The method of claim 10, wherein the reference data comprises an internet address.

12. The method of claim 10, further comprising detecting a landing strip using a landing sensor.

13. The method of claim 12, further comprising detecting the reference indicator using the reference sensor responsive to detecting a landing strip with the landing sensor.

14. The method of claim 10, further comprising:
storing the wirelessly retrieved autonomous vehicle instruction in a memory unit; and
reading the autonomous vehicle instruction associated with the reference data from a database comprising autonomous vehicle instructions, wherein the database is stored in the memory unit.

15. The method of claim 10, further comprising reading a graphic containing the reference data with the reference sensor.

16. The method of claim 15, wherein the graphic is a Quick Response (QR) code.

17. An article of manufacture including a tangible non-transitory computer-readable storage medium having stored thereon computer-readable instructions that, upon execution by a computing device, cause the computing device to perform functions comprising:
detecting a reference indicator using a reference sensor in a vehicle, wherein the reference indicator provides reference data, and wherein the reference data provides associated location information including global coordinate information;
wirelessly retrieving an autonomous vehicle instruction associated with both the reference data and a serial number of the vehicle; and,
executing the autonomous vehicle instruction.

18. The article of manufacture of claim 17, wherein the reference data comprises an internet address.

19. The article of manufacture of claim 17, wherein the reference indicator is a graphic.

* * * * *